(12) United States Patent
Facius et al.

(10) Patent No.: US 7,972,007 B2
(45) Date of Patent: Jul. 5, 2011

(54) IMAGE GENERATING APPARATUS USING A MIRROR COMMON TO A PLURALITY OF OPTICAL PATHS

(75) Inventors: Zoltan Facius, Kernen (DE); Markus Kamm, Karlsruhe (DE)

(73) Assignee: Sony Deutschland GmbH, Berlin (DE)

( * ) Notice: Subject to any disclaimer, the term of this patent is extended or adjusted under 35 U.S.C. 154(b) by 590 days.

(21) Appl. No.: 12/037,680

(22) Filed: Feb. 26, 2008

(65) Prior Publication Data

US 2008/0284920 A1 Nov. 20, 2008

(30) Foreign Application Priority Data

Mar. 31, 2007 (EP) .................................. 07006768

(51) Int. Cl.
| | |
|---|---|
| G03B 21/00 | (2006.01) |
| G03B 21/26 | (2006.01) |
| G03B 21/28 | (2006.01) |
| G03B 21/14 | (2006.01) |
| H04N 5/74 | (2006.01) |
| G02B 26/08 | (2006.01) |
| G03H 1/02 | (2006.01) |
| H01S 5/00 | (2006.01) |

(52) U.S. Cl. ................. 353/31; 353/94; 353/81; 353/98; 353/97; 348/751; 359/204.1; 359/27; 372/50.12

(58) Field of Classification Search .................... 353/31, 353/94, 81, 98, 97; 348/751; 359/204.1, 359/27; 372/50.12

See application file for complete search history.

(56) References Cited

U.S. PATENT DOCUMENTS

| | | | | |
|---|---|---|---|---|
| 5,734,488 | A * | 3/1998 | Konno | 359/204.1 |
| 6,493,010 | B1 * | 12/2002 | Takahashi et al. | 347/116 |
| 6,596,985 | B2 * | 7/2003 | Sakai et al. | 250/234 |
| 7,088,353 | B2 * | 8/2006 | Fujii et al. | 345/204 |
| 2005/0057727 | A1 | 3/2005 | Troyer | |
| 2006/0126155 | A1 | 6/2006 | Kowarz et al. | |
| 2006/0209167 | A1 * | 9/2006 | Shiraishi | 347/232 |
| 2010/0020291 | A1 * | 1/2010 | Kasazumi et al. | 353/38 |

FOREIGN PATENT DOCUMENTS

| | | |
|---|---|---|
| EP | 1 463 337 A2 | 9/2004 |
| EP | 1 655 636 A1 | 5/2006 |
| WO | WO 2006/065524 A2 | 6/2006 |
| WO | WO 2006/065537 A2 | 6/2006 |
| WO | WO 2006/137326 A1 | 12/2006 |

OTHER PUBLICATIONS

Office Action issued Oct. 27, 2010, in China Patent Application No. 200810090035.3, filed Mar. 31, 2008 (English-language Translation only).

* cited by examiner

*Primary Examiner* — Georgia Y Epps
*Assistant Examiner* — Magda Cruz
(74) *Attorney, Agent, or Firm* — Oblon, Spivak, McClelland, Maier & Neustadt, L.L.P.

(57) ABSTRACT

An image generating apparatus is provided, which has a plurality of image generating optical paths and means for simultaneously deflecting a received plurality of light beams of primary illumination light having coherence properties. The received light beams are assigned to the respective optical paths. The means for deflecting simultaneously optically couples each of the received light beams into a respective assigned optical path and irradiates intermediate faces of illumination units of each respective optical path with the respective assigned light beam. The means for deflecting is configured so that, during the process of irradiating, each of the light beams subsequently in time irradiates different portions of the respective assigned intermediate faces.

24 Claims, 7 Drawing Sheets

IMAGE GENERATING APPARATUS USING A MIRROR COMMON TO A PLURALITY OF OPTICAL PATHS

FIELD OF THE INVENTION

The present invention relates to an image generating apparatus and in particular a projection apparatus using laser light sources and more particular to a RGB laser projector with improved image quality.

BACKGROUND OF THE INVENTION

Nowadays apparatuses and devices for generating images and for projecting the same as well as their miniaturization become more and more important in many customer devices and electronic appliances. The problem of such apparatuses and devices—in particular when using light sources which at least to some extent produce or at least involve coherent light—is that in the process of image generation and image projection the produced images contain noise and other inhomogenities which are due to the coherent nature of the involved light. These inhomogenities are in part in particular caused by interference processes at optical faces, surfaces or interfaces. The noise component is usually called speckle and is generated majorly by interference processes, for instance at diffusing faces or interfaces, e.g. at diffusing screens.

These circumstances are also given when using a plurality of different light sources having coherence properties and having different spectral properties, e.g. different colours.

SUMMARY OF THE INVENTION

It is therefore an object underlying the present invention to provide an image generating apparatus which is capable of at least reducing the content of inhomogenities and speckle in the produced images and which has at the same time a more compact structure.

The object underlying the present invention is solved by an image generating apparatus according to claims 1 and 3. Embodiments and modifications of the image generating apparatus according to the present invention are within the scope of the dependent claims.

According to one aspect of the present invention an image generating apparatus is provided. Said image generating apparatus comprises a plurality of image generating optical paths each of said image generating optical paths having a respective intermediate face and single means—common for said plurality of optical paths—for simultaneously deflecting a received plurality of light beams of primary illumination light having coherence properties, each of said light beams being assigned to a respective one of said optical paths, wherein said single and common means for deflecting is configured in order to simultaneously optically couple each of said received light beams into a respective assigned optical path and to thereby simultaneously irradiate each of said intermediate faces with a respective one assigned light beam, and wherein said single and common means for deflecting is configured in order to have—during said process of irradiating—each of said light beams subsequently in time irradiate different portions of said respective assigned intermediate face.

It is therefore on the one hand one aspect of the present invention to provide said means for deflecting said received light beams of primary illumination light having coherence properties with the functionality to have said deflected light beams of primary illumination light subsequently irradiate different portions of an assigned intermediate face of an assigned means for illuminating. As a consequence as time progresses the differently illuminated portions of the respective assigned intermediate faces which are well used for image generation at least to some extent loose their coherency property and are therefore to some extent incoherent with respect to each other as there exist and appear at different time instances. Therefore because of the lost of coherency—they cannot contribute to the speckle phenomenon anymore.

It is, on the other hand, an aspect of the present invention to realize a comparable compact structure for an image generating apparatus which uses a plurality of different image generating optical paths. This is achieved by providing said means for deflecting said received light beams of primary illumination light having coherence properties as a common means for deflecting—common for the entire plurality of optical paths and with the functionality to have each of said deflected light beams of primary illumination light simultaneously enter one respective optical path assigned thereto.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

In the following functional and structural similar or equivalent element structures will be denoted with the same reference symbols. Not in each case of their occurrence a detailed description will be repeated.

At first, in the following reference is taken to the Figs. in general:

According to one aspect of the present invention said image generating apparatus 1 is proposed, comprising a plurality of three image generating optical paths P1, P2, P3, each of said image generating optical paths P1, P2, P3 having a respective intermediate face 21, 21-1, 21-2, 21-3; S, S1, S2, S3, and comprising a sweep mirror 11 as single means 10—common for said plurality of optical paths P1, P2, P3—for simultaneously deflecting a received plurality of light beams l1, l2, l3 of primary illumination light L1 having coherence properties, each of said light beams l1, l2, l3 being assigned to a respective one of said optical paths P1, P2, P3, for being deflected in one or two dimensions, wherein each optical path P1, P2, P3 comprises respective three image generating panel 31-1, 31-2, 31-3 as respective means 30, 30-1, 30-2, 30-3 for generating a respective partial images I, I-1, I-2, I-3, each of said three image generating panels 31-1, 31-2, 31-3 for displaying a partial image I1, I2, I3 in the primary colours red, green, and blue respectively, and respective illumination optical means as respective means 20, 20-1, 20-2, 20-3 for illuminating said respective means 30, 30-1, 30-2, 30-3 for generating said respective partial image I, I1, I2, I3, each means 20, 20-1, 20-2, 20-3 for illuminating having said respective intermediate face 21, 21-1, 21-2, 21-3; S, S1, S2, S3, each of said respective illumination optical means modify respective beams l1, l2, l3 of light in order to illuminate a respective panel 31-1, 31-2, 31-3 uniformly and with a beam shape being congruent to the shape of the respective panel 31-1, 31-2, 31-3, wherein said single and common means 10 for deflecting is configured in order to simultaneously optically couple each of said received light beams l1, l2, l3 into a respective assigned optical path P1, P2, P3 and to thereby simultaneously irradiate each of said intermediate faces 21, 21-1, 21-2, 21-3; S, S1, S2, S3 with a respective one assigned light beam l1, l2, l3, wherein said single and common means 10 for deflecting is configured in order to have—during said process of irradiating and by being tilted—each of said light beams l1, l2, l3 by reflecting said light beams l1, l2, l3 into common or different directions, dependent on the angle of incidence subsequently in time irradiate different portions of said respective assigned intermediate face 21, 21-1, 21-2, 21-3; S, S1, S2, S3 by sweeping each of said respective light beams l1, l2, l3 across a respective intermediate face 21, 21-1, 21-2, 21-3; S, S1, S2, S3, further comprising a projection lens PL as means 40 for projecting said partial images I1, I2, I3 received from said respective means 30-1, 30-2, 30-3 for generating said partial images I1, I2, I3, which projects the partial images I1, I2, I3 displayed on the respective panels 31-1, 31-2, 31-3, wherein said means 40 for projecting said partial images I1, I2, I3 has an aperture stop 41, AS, and wherein each one of said intermediate faces face 21, 21-1, 21-2, 21-3; S, S1, S2, S3 of said respective means 20, 20-1, 20-2, 20-3 for illuminating is positioned in optical conjugation with respect to said aperture stop 41, AS, further comprising three laser light sources l1, l2, l3 for emitting light of said respective primary colours and comprising means for converging respective light beams l1, l2, l3 at common or different angles of incidence to a common point or region at said sweep mirror 11, and further comprising means 43 for combining said light beans l1, l2, l3 of said primary colours emitted from said respective panels 31-1, 31-2, 31-3 into a common optical path.

In addition, in the proposed Image generating apparatus 1 two laser light sources l1, l2 may be combined Into a common optical path, said common optical path for said two laser light sources l1, l2 and the single optical path for the remaining laser light source l3 may be converged under different angles of incidence at a common point or region of said sweep mirror 11 and reflected into different directions, dependent on the angle of incidence, one common illumination unit 20-1 may be provided for the common optical path and one illumination unit 20-2 may be provided for the single optical path, and an X-cube or cross-prism may be provided for combining the red, green, and blue light of the partial images I1, I2, I3 into a common optical path.

According to one aspect of the present invention said image generating apparatus 1 may comprise a plurality of image generating optical paths P1, P2, P3, each of said image generating optical paths P1, P2, P3 having a respective intermediate face 21, 21-1, 21-2, 21-3; S, S1, S2, S3, and also may comprise single means 10—common for said plurality of optical paths P1, P2, P3—for simultaneously deflecting a received plurality of light beams l1, l2, l3 of primary illumination light L1 having coherence properties, each of said light beams l1, l2, l3 being assigned to a respective one of said optical paths P1, P2, P3, wherein said single and common means 10 for deflecting is configured in order to simultaneously optically couple each of said received light beams l1, l2, l3 into a respective assigned optical path P1, P2, P3 and to thereby simultaneously irradiate each of said intermediate faces 21, 21-1, 21-2, 21-3; S, S1, S2, S3 with a respective one assigned light beam l1, l2, l3, and wherein said single and common means 10 for deflecting is configured in order to have—during said process of irradiating—each of said light beams l1, l2, l3 subsequently in time irradiate different portions of said respective assigned intermediate face 21, 21-1, 21-2, 21-3; S, S1, S2, S3.

Each image generating optical path P1, P2, P3 may comprise respective means 30, 30-1, 30-2, 30-3 for generating a respective partial image I, I-1, I-2, I-3.

Each image generating optical path P1, P2, P3 may comprise respective means 20, 20-1, 20-2, 20-3 for illuminating said respective means 30, 30-1, 30-2, 30-3 for generating said respective partial image I, I1, I2, I3, each means 20, 20-1, 20-2, 20-3 for illuminating having said respective intermediate face 21, 21-1, 21-2, 21-3; S, S1, S2, S3.

Said single and common means 10 for deflecting may be adapted in order to have during said process of irradiating said intermediate faces 21, 21-1, 21-2, 21-3; S, S1, S2, S3 each of said light beams l1, l2, l3 take sequentially or consecutively in time different positions on said respective assigned intermediate face 21, 21-1, 21-2, 21-3; S, S1, S2, S3.

Said single and common means 10 for deflecting may be adapted in order to have during said process of irradiating said intermediate faces 21, 21-1, 21-2, 21-3; S, S1, S2, S3 each of said light beams l1, l2, l3 sweep across said respective assigned intermediate face 21, 21-1, 21-2, 21-3; S, S1, S2, S3.

Said single common means 10 for deflecting may be adapted in order to have during said process of irradiating said intermediate face 21, 21-1, 21-2, 21-3; S, S1, S2, S3 each of said light beams l1, l2, l3 continuously move across said respective intermediate face 21, 21-1, 21-2, 21-3; S, S1, S2, S3.

Said intermediate face 21, 21-1, 21-2, 21-3; S, S1, S2, S3 may be a surface of said respective means 20, 20-1, 20-2, 20-3 for illuminating.

Said intermediate face 21, 21-1, 21-2, 21-3; S, S1, S2, S3 may be an interface of said means 20, 20-1, 20-2, 20-3 for illuminating.

Said intermediate face 21, 21-1, 21-2, 21-3; S, S1, S2, S3 may be a virtual plane of said means 20, 20-1, 20-2, 20-3 for illuminating.

Said intermediate face 21, 21-1, 21-2, 21-3; S, S1, S2. S3 is a face of a diffuser 22 of said means 20, 20-1, 20-2, 20-3 for illuminating.

Said image generating means I may further comprise means 40 for projecting said partial images I1, I2, I3 received from said respective means 30-1, 30-2, 30-3 for generating said partial images I1, I2, I3.

Said means 40 for projecting said partial images I1, I2, I3 may have an aperture stop 41, AS.

Each one of said intermediate faces face 21, 21-1, 21-2, 21-3; S, S1, S2, S3 of said respective means 20, 20-1, 20-2, 20-3 for illuminating may be positioned in optical conjugation with respect to said aperture stop 41, AS.

Said means 40 for projecting may comprise means 43 for receiving said partial images I1, I2, I3 and for combining said partial images I1, I2, I3 into a combined image I.

Said means 10 for deflecting may be or may comprise a mirror 11.

Said mirror 11 may be adapted for being mechanically tilted in order to thereby deflect each of said received light beams I1, I2, I3 across said respective assigned intermediate face 21, 21-1, 21-2, 21-3; S, S1, S2, S3.

Said mirror 11 may be adapted in order to have each of said deflected light beams l1, l2, l3 move across said respective assigned intermediate face 21, 21-1, 21-2, 21-3; S, S1, S2, S3 in one of a circular manner, a linear manner, cyclical manner and chaotic manner.

Said image generating apparatus 1 may further comprise means 50 for generating primary illumination light L1 which is adapted in order to direct said primary illumination light L1 to said means 10 for deflecting said primary illumination light L1.

Said means 50 for generating primary illumination light L1 may have an according plurality of laser light sources 51-1, 51-2, 51-3.

Said means 50 for generating primary illumination light L1 may have an according plurality of arrays of laser light sources 51-1, 51-2, 51-3 which are adapted in order to generate and direct respective arrays of laser light beams l1, l2, l3 to said means 10 for deflecting said primary illumination light L1.

Each of said means I1, 30-1, 30-2, 30-3 for generating a partial image I1, I2, I3 may be or may comprise a respective image modulator LCD1, LCD2, LCD3.

Each of said means 30, 30-1, 30-2, 30-3 for generating a partial image I1, I2, I3 may be or may comprise at least one respective liquid crystal display element LCD1, LCD2, LCD3.

Said means 50 generating primary illumination light L1 may have a focal plane.

Said means 10 for deflecting may be positioned in said focal plane.

Each of said means 20, 20-1, 20-2, 20-3 for illuminating may be or comprise an illumination unit.

For the plurality of image generating optical paths P1, P2, P3 single first collimation optics 23-1 is provided common for said plurality of image generating optical paths P1, P2, P3.

These and further aspects of the present invention will be further discussed in the following:

The present invention inter alia also relates to a RGB Laser Projector with improved image quality.

It is proposed to provide an optical module to be used in projectors incorporating micro displays and enlarging optics to generate images on a screen.

As light source multiple lasers of different wavelengths are used to generate coloured images. To avoid image artefacts caused by interference structures introduced by the coherency of light and periodic structures of the optical elements, a special beam sweeping part is used in combination with illumination optic.

The optical system includes a beam sweeping element and is a compact and low cost solution for an optical illumination system based on laser light sources.

Micro display based projection systems, especially systems with reflective micro displays, like LCoS (Liquid Crystal on Silicon) are well known for many years. The arrangement of displays around the polarizing beam splitting cubes and colour recombination cube is a kind of standard architecture used in LCoS based projection systems: see FIG. 5.

Known projectors are working with high pressure discharge lamps on mercury or xenon basis. The white spectrum of the lamp is divided into separate wavelength regions and then each wavelengths region is modulated by a single imager responsible for the wavelength portion. Usually 3 imagers are used: one for green, one for blue and one for red.

Taking three laser light sources, e.g. red, green and blue, to illuminate three displays would require three illumination paths adapted to the laser light sources. This would increase the size and cost of the projector. Further speckle reduction techniques had to be implemented into three illumination channels, which further increases cost.

Our system shows how to minimize and simplify illumination optics, by keeping system compactness and the advantages of laser light sources.

Laser light sources supply already discrete wavelengths, for instance R (red), G (green) and B (blue). Projectors using laser light sources therefore need no wavelength separation. The problem here is to find a good compromise between the benefit of already separated colours and the compactness of the illumination system.

In addition lasers are a coherent and monochrome light source, causing light interferences (e.g. speckle). Laser illumination therefore must also incorporate speckle noise reduction techniques.

Following description is related to the invented optical architecture using red, blue and green laser light sources for illumination of micro displays, and projecting the image content onto a screen.

Figure 4A:
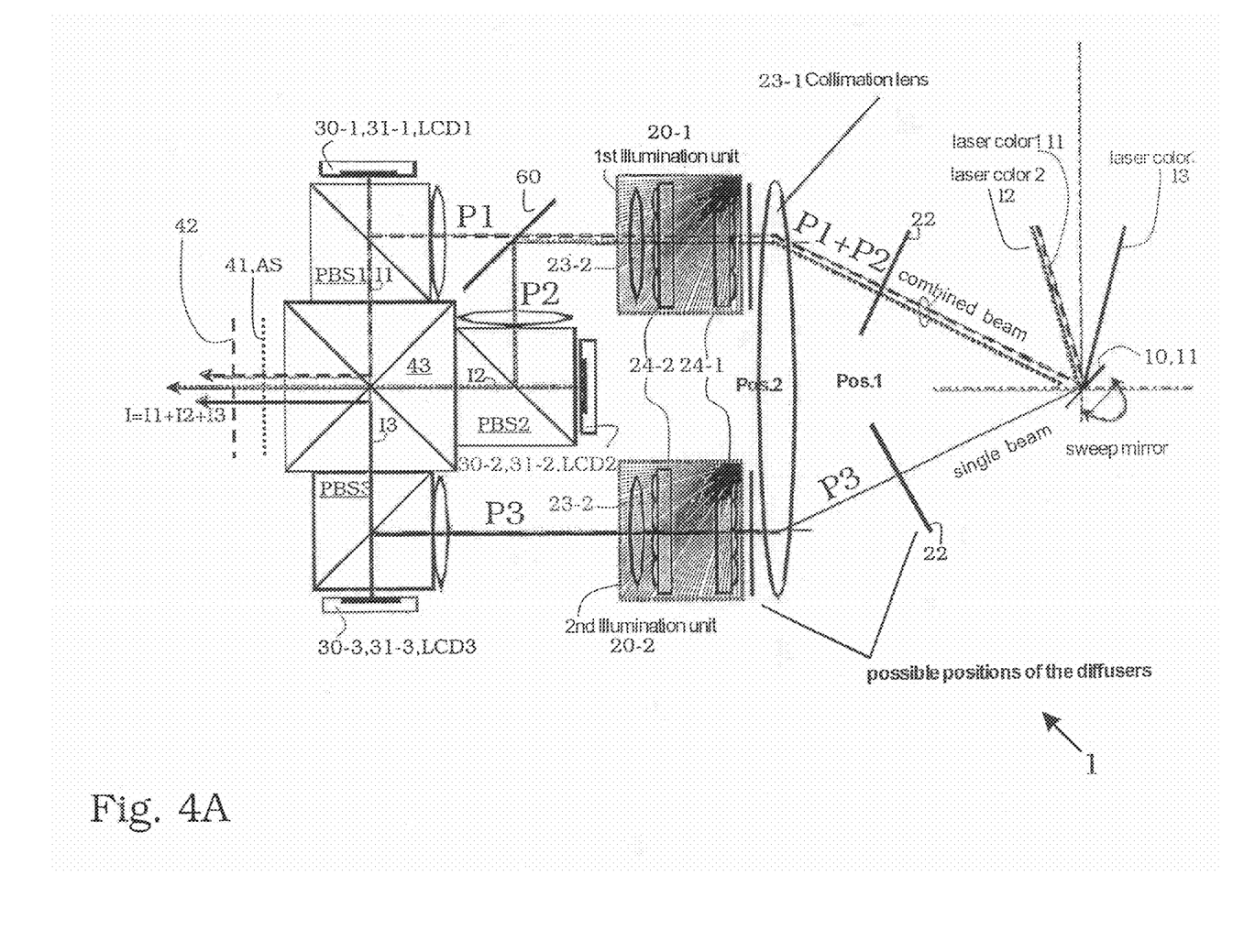
FIGS. 4A-C are schematic and cross-sectional side views of further embodiments of an image generating apparatus according to the present invention.

The illumination arrangement as an image generating apparatus—an embodiment thereof is shown in FIG. 4A—is also called optical engine and consists of two main parts. The first part consists of the above mentioned three laser light sources, a sweep mirror or rotating mirror, a collimation lens and optional two diffusers. The second part consists of an arrangement of two illumination units (here: two pairs of lens arrays, two condenser lenses) and one dichroic mirror for colour splitting.

Further, in the second part, an arrangement of three polarizing beam splitter cubes (PBS) attached around a colour recombination cube is provided. At the light entrance section of the PBS, field lenses are placed to provide reflective micro displays with telecentric illumination. The three reflective micro displays placed in such a way that the incoming s polarized light is first reflected by the PBS onto the micro display. The micro displays modulate the light and reflect it in direction to the colour recombination cube.

Description of the working principle, starting with the first part of optical engine: A red, a green and a blue laser light source is used, where each laser light sources can emit either a single beam or an array of laser beams. The laser light sources are arranged in a way that the beams from two lasers are combined into a common optical path by use of an dichroic mirror. The beam of the third laser is separated, having different optical path. In the following text these beams are called combined beam and single beam, respectively. The combined and single beams are arranged around the sweep mirror in that way that both paths are converging under a different angle directly onto the mirror. Additional lenses can be used before the sweep mirror in order to focus each beam or array of beams onto the sweep mirror and to form a small spot at the sweep mirror, even if the laser beams consist of an extended array of sub-beams. The combined and the single beam are reflected at the sweep under different angles. A collimation lens is placed in such a position, that the sweep mirror is at the focal point of the collimation lens. Therefore both the combined and the single beam are collimated after the collimation lens and parallel to each other.

The sweep mirror can tilt a few degrees in one or two dimensions around a static pivot, which lies in the focal point of the collimation lens. With the movement of the sweep mirror both the combined and the single beam sweep across the entrance section of the illumination units, thereby reducing speckle noise. The movement should be fast enough to avoid flickering.

Description of the Second Part of Illumination Optics:

The illumination units will generate a uniform and rectangular light distribution at the micro display. This configuration is standard in most of the LCD projectors. Only difference here is that we are using two illumination paths, one for the single beam and the other for the combined beam.

In the optical path of combined beam we have put a dichroic mirror to split the combined beam in to its two discrete wavelengths again to illuminate the micro displays with their required colour.

After light is modulated by each of the three micro displays the modulated light is guided to the colour recombination cube to combine all three colours and to project a full coloured picture onto the screen.

The proposed system has an increased image quality, by reducing interference pattern and speckle without loosing throughput efficiency.

According to a further aspect a very compact architecture for illuminating three micro displays, each with a discrete wavelength from a laser source, is demonstrated. It is more compact compared to combining all three laser beams into one beam, having one common speckle reducing illumination unit, but then again splitting the light into three discrete optical paths in order to illuminate the micro displays.

Still according to a further aspect the proposed arrangement is more compact than illuminating each micro display separately by three different illumination units with three different speckle reduction means.

Only one sweeping, rotating, vibrating or shaking deflection device is needed in order to reduce interference pattern on three wavelengths.

In the following some further basic aspects are elucidated.

The present invention inter alia also relates to a projection apparatus as an image generating apparatus using laser light sources as such.

The invention describes the optical part of a projection system using lasers as light sources. Laser illuminated projectors usually generate inhomogeneous and noisy pictures due to the coherent nature of laser light. The inhomogeneity is caused by interferences at optical surfaces within the optical part and the "noise"—usually called (subjective) speckle—appears at the retina of the observers eye and is generated by interferences at the diffusing screen.

An apparatus is presented which solves the problem of inhomogeneity and reduces the speckle phenomenon.

Laser projectors are known which use a single laser beam for each colour (R, G, B) which scans line by line across the screen. The image is generated on the screen by modulating the beam intensity synchronously with the beam's position on the screen. Tilting mirrors are used to deflect the beam in the horizontal and vertical direction.

Also known are laser projectors using the GLV (Grating Light Valve) technology. In such devices the laser beam is expanded into a vertical line which illuminates a 1-dimensional image modulator (GLV chip). The GLV chip modulates the intensity of the reflected light in order to generate a vertical line image. The vertical line image is deflected into the horizontal direction by use of a rotating mirror. A full image is generated by changing the vertical line image content of the GLV chip synchronously with the line's horizontal position on the screen.

A granulated pattern called "speckle" is observed, when laser light is scattered by a diffusing surface. This phenomenon is caused by the coherence of laser light. The phenomenon is described in "J. W. Goodman, J. Opt. Soc. Am, Vol. 66, No. 11, November 1976". Goodman describes also ways to suppress speckle.

It is known that laser speckle can be reduced by the presence of a moving random diffuser or random phase retarder in the optical path, at a point where the laser is focused before the image formation device or at a plane where the image is formed in the optical systems. (see Trisnadi in Proc SPIE 4657, 2002).

Laser illuminated projectors generate inhomogeneous and noisy pictures due to the coherent nature of laser light.

The inhomogeneity—which we also call "objective speckle"—is caused by interferences of coherent light at rough surfaces, surface imperfections and aperture stops within the optical system. The speckle pattern appearing on the screen is independent from the viewing conditions of the observer, e.g. it is independent from position, viewing angle or pupil size of the observer.

The noise—which we also call "subjective speckle"—is caused by interference of coherent light with the rough surface or with the diffusing particles of a screen. Coherent light is interfering constructively or destructively when it is scattered into different directions, thereby generating a granulated speckle pattern in the image plane of the observer (e.g. retina of the human eye). The speckle pattern changes ("moves") when the position or viewing angle of the observer is changed.

The present invention describes the conditions of an optical set-up which reduces both objective and subjective speckle.

Figure 1:
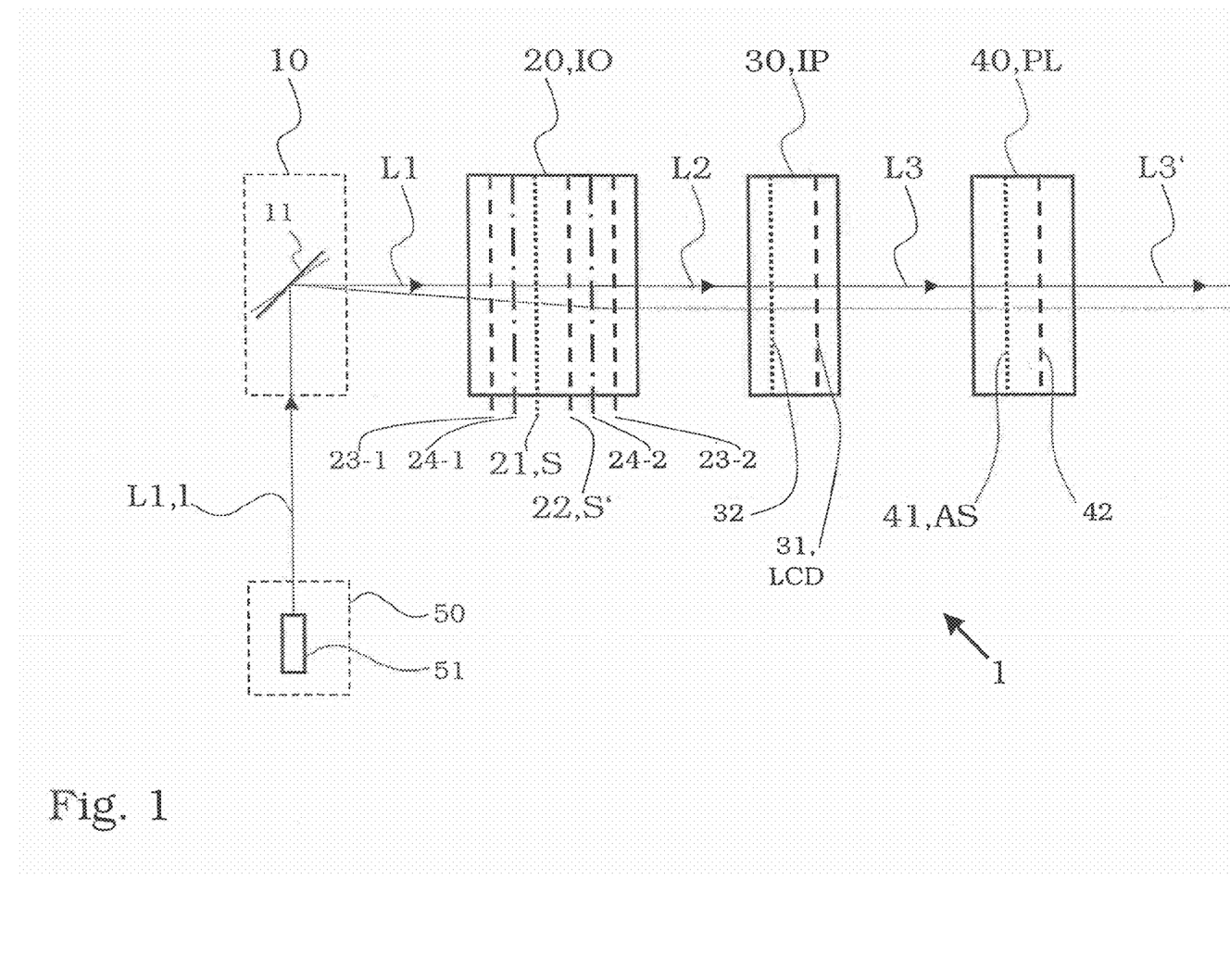
FIG. 1 is a schematic block diagram for elucidating some basic aspects of an embodiment of the image generating apparatus according to the present invention.
Figure 2:
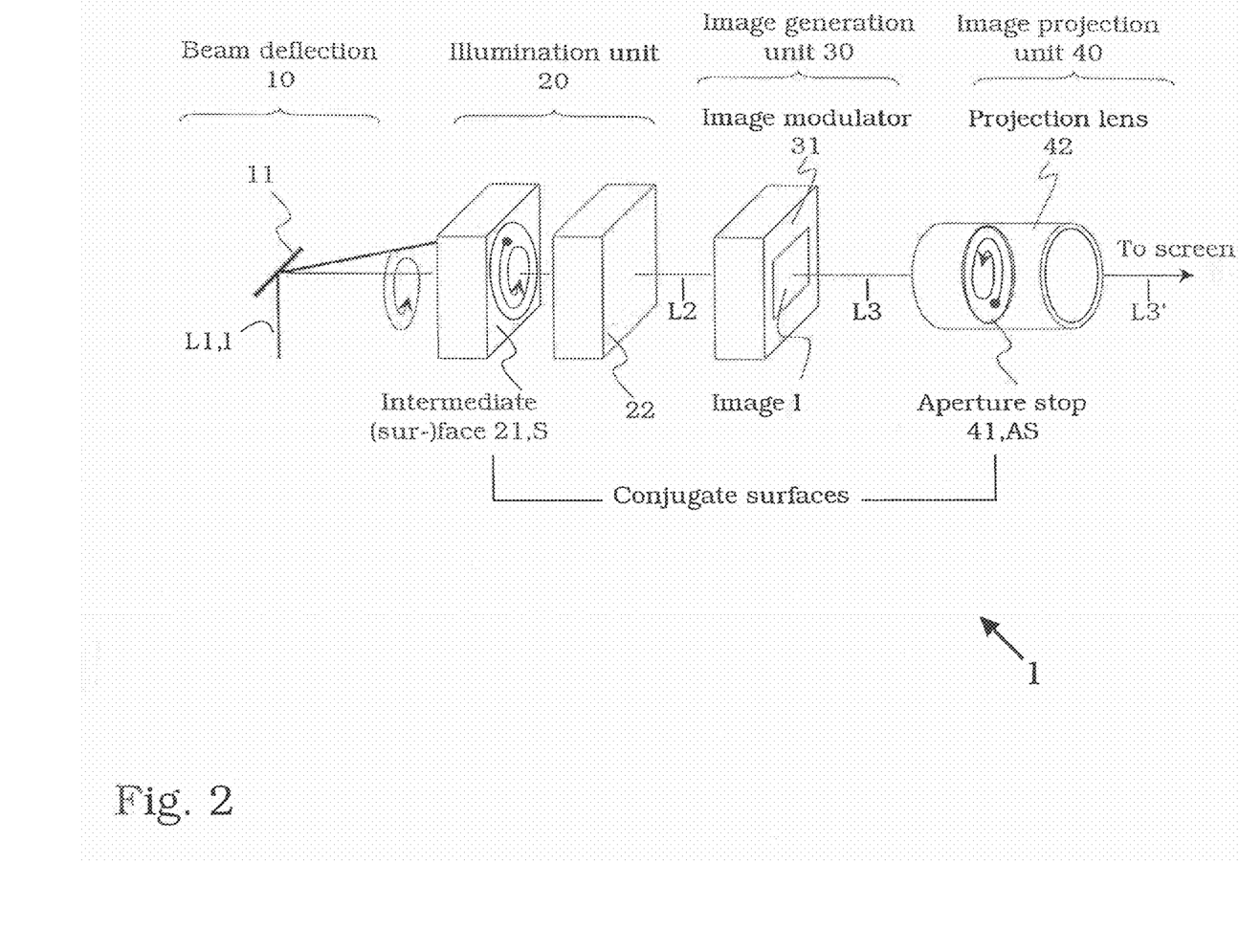
FIG. 2 is a schematic and perspective side view for elucidating some basic aspects of another embodiment of an image generating apparatus according to the present invention elucidating more constructive details thereof.

FIGS. 1 and 2 demonstrate the general principle of speckle reduction by using an intermediate face 21, 21-1, 21-2, 21-3; S, S1, S2, S3.

As shown in the Figs, and in particular in FIGS. 1 and 2, a laser beam 1 or a set of multiple coincident laser beams or an array of laser beams is deflected, e.g. by use of a mechanically tilting mirror 11, in order to sweep across an intermediate surface S which is located within the illumination unit 20 of a projector I as an image generating apparatus in the sense of the present invention. The beam 1 can sweep in a circular manner or in a linear manner or any other trajectory T across the intermediate face or surface S. The motion pattern can repeat cyclically or it can sweep chaotically. Optionally a diffuser 22 can be used to blur the laser spot for better uniformity.

An image I of the intermediate surface S is formed in the vicinity of the aperture stop AS of the projection lens 42, because S and AS are conjugate to each other.

The illumination unit 20 illuminates the image modulator 31, e.g. LCD panel, of the means 30 for image generation.

The image I is projected in the usual way by means of a projection lens onto the screen.

For each received light beam lj according to the sweeping process a series of beamlets Bi is generated. Each beamlet $B_i$ emerging from the projection lens 42 creates a specific speckle pattern on the retina of the observers eye.

A certain minimal angular separation $\Delta_{min}$ between each two beamlets $B_m$, $B_n$ is required to make sure that the speckle patterns created by each beamlet are uncorrelated to each other.

The value for $\Delta_{min}$ depends on the wavelength bandwidth, the type of screen, the distance between observer and screen and the size of the pupil of the observer. A typical value found experimentally is $\Delta_{min} \approx 0.5 \Theta_{Eye}$. But other values might be found depending on the specific conditions (bandwidth, . . . ).

Due to the limitation of $\Delta_{min}$ only a limited number of N uncorrelated beamlets can fill the projection cone angle $\Theta_{Proj}$.

The beamlets $B_i$, i=[1, . . . N], are incoherent with respect to each other as they exist (appear) at disjunct times.

As the speckle pattern created by the beamlets are uncorrelated with respect to each other (condition of $\Delta_{min}$) and the beamlets are incoherent to each other (disjunct times), the superposition of all individual beamlets leads to a pattern with speckle contrast reduced by factor $\sqrt{N}$.

Integrator plates 24-1, 24-2 may be used in the illumination part 20 of the projectors I in order to illuminate the image modulator 31 homogeneously and with rectangular shape.

The laser beam l or a set of multiple coincident laser beams or an array of laser beams is swept across a collimation lens 23-1 in such a way that the active area of a $1^{st}$ integrator plate 24-1 is partially or entirely covered. An optional diffuser 22 at any position before a $1^{st}$ integrator plate 24-1 can be used to blur the laser spot and to improve the uniformity.

A $2^{nd}$ integrator plate 24-2 may be used in conjugate position to the aperture stop 41, AS of the projection lens 42. As a result light sweeps in a similar (but inverted) way across the aperture stop 41, AS like it seeps across the $2^{nd}$ integrator plate 24-2.

Figure 4B:
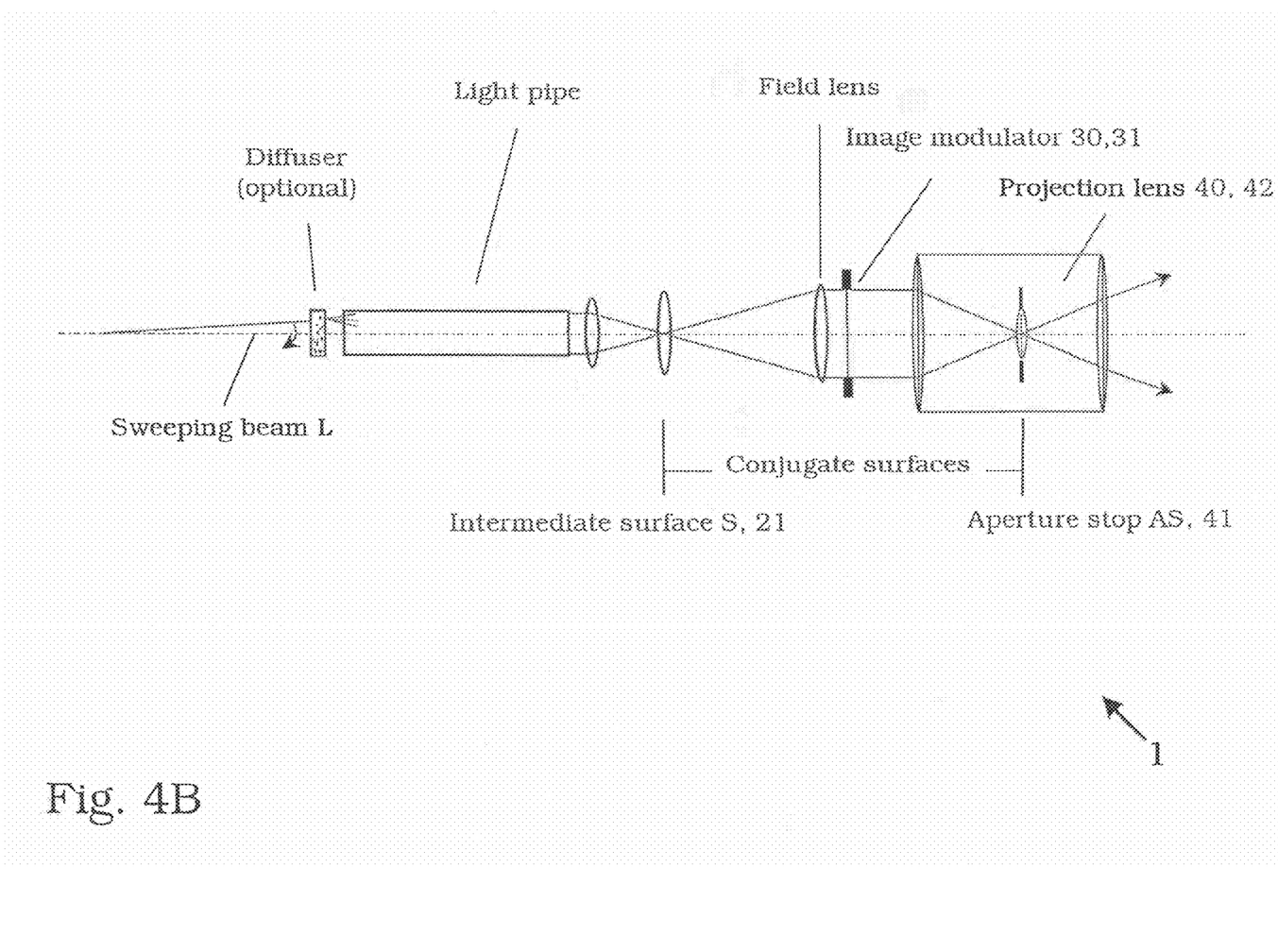

Light pipe illumination with a light pipe 25 may be used in order to illuminate the image modulator 31 homogeneously and with rectangular shape.

The laser beam l or a set of multiple coincident laser beams or an array of laser beams is swept across the entrance of the light pipe 25 in such a way that the entrance area is partially or entirely covered. An optional diffuser 22 in front of the light pipe 25 can be used to blur the laser spot and to improve the uniformity. The exit surface of the light pipe 25 is imaged by a relay lens 23-3 to the image modulator 31. The relay lens 23-3 may be in conjugate position to the aperture stop 41, AS of the projection lens 42. As a result light sweeps in a similar but inverted way across the aperture stop 41, AS like it seeps across the relay lens 23-3.

Due to the multiple internal reflections inside the light pipe 25 the light trajectory T of the light spot across the relay lens 23-2 is different to the trajectory of the light spot across the entrance of the light pipe 25.

Figure 4C:
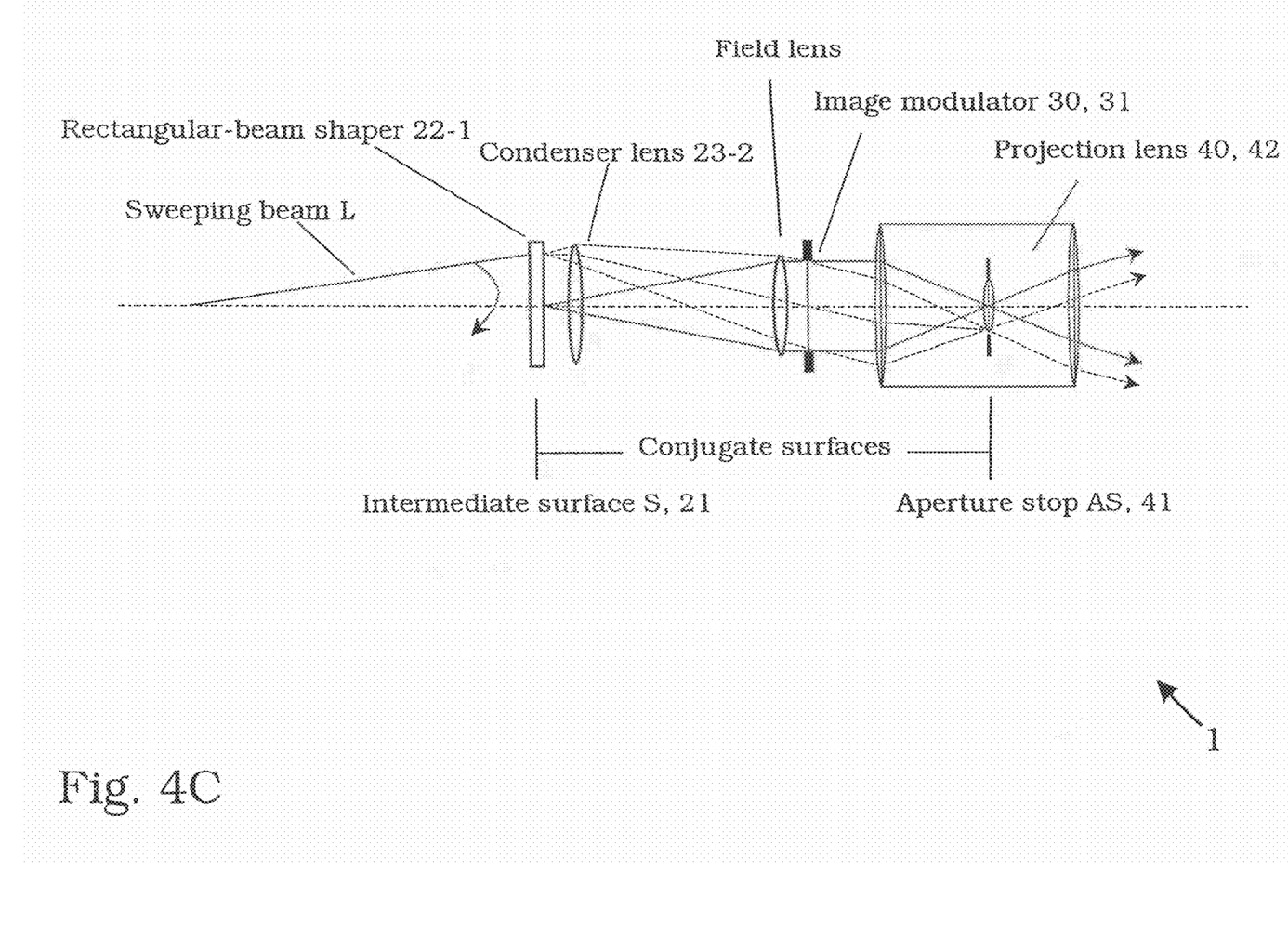

A rectangular-beam diffuser 22-1 may be involved which diffuses collimated light beams into a pyramidal solid angle.

It can be realized by a diffractive optical element of by a refractive element with a micro-structured surface and is known from prior art.

A rectangular-beam diffuser 22-1 is used to illuminate the image modulator 31 homogeneously and with rectangular shape.

A laser beam l or a set of multiple coincident laser beams or an array of laser beams is swept across the rectangular-beam diffuser 22-1 in such a way that it is partially or entirely covered. The rectangular-beam diffuser is in conjugate position to the aperture stop AS of the projection lens. As a result light sweeps in a similar (but inverted) way across the aperture stop like it seeps across the rectangular-beam diffuser.

A laser beam array or a laser beam 1 with linear cross section or a set of multiple coincident lasers of that kind may be focussed by a lens or alternatively a cylindrical lens 52 with axis perpendicular to the linear laser line onto a mirror 11 which is rotating about an axis which is parallel to the linear laser line. The rotation axis lies in the mirror plane.

The mirror 11 is rotating about that axis a few degrees from left to right, thereby sweeping the linear shaped laser beam across the $1^{st}$ integrator plate 24-1.

Optionally a diffuser 22 can be placed at any position before the $1^{st}$ integrator plate 24-1 in order to improve the uniformity.

A laser beam l or a set of multiple coincident laser beams or an array of laser beams may be focussed by a lens onto a mirror 11 which is rotating about an axis, which is going through the centre of the mirror 11. The axis is tilted by a few degrees from the normal axis of the mirror plane, thereby wobbling the mirror when rotated about the axis and deflecting the laser beam along a tapered surface. The geometrical dimensions are adapted in order that the surface of the $1^{st}$ integrator plate 24-1 is partially or completely covered by the circulating laser beam l. An optional diffuser 22 can be placed preferably between the mirror 11 and the collimation lens 23-1 in order to blur the laser spot and to cover the $1^{st}$ integrator 24-1 in a more uniform way.

The present invention according to one aspect integrates laser light sources into known optical illumination architectures of micro-display type projectors.

The present invention inter alia also relates to an image generating apparatus 1 which comprises an illumination unit 20 having an intermediate face 21, S, as well as an image modulator 30 for generating an image I. In addition a deflecting means 10 for deflecting a received light beam I of primary illumination light L1 to said illumination unit 20 is provided in order to irradiate said intermediate face 21, S. Said deflecting means 10 is adapted to have—during the process of irradiating said intermediate face 21, S—said light beam l subsequently in time irradiate different portions of said intermediate face 21, S in order to thereby reduce the speckle effect.

According to certain embodiments of the present invention the following aspects may be essential for an projection type image generating apparatus, namely the provision of:
  an image generating panel,
  a projection lens, which projects the image displayed on the panel onto a screen,
  a light source, which illuminates the panel, and
  an illumination optical means, which modify the beam of the light source in order to illuminate the panel uniformly and with a beam shape congruent to the shape of the panel (generally rectangular shaped).

According to certain embodiments of the present invention essential means to be provided and measures to be taken for speckle reduction of an image generating apparatus using laser light may be based on the following:

Each Projection lens or optics PJ has a pupil with a certain diameter. This diameter together with the distance to the screen defines a maximum cone angle of a projected point. This cone angle of a projected point is essential for speckle reduction, if it is ensured that light at any two locations within this cone is incoherent to each other. In case of laser light sources such incoherency can be achieved, if a laser beam is sweeping across the pupil, thereby covering the entire area of the pupil within a certain time. This ensures that light at any two locations within the pupil cannot interfere with each other, as light doesn't exist at any two locations at the same point of time.

According to certain embodiments of the present invention illumination optics in a projection apparatus may have an intermediate surface S which is in conjugate position to the pupil of the lens. The term optical conjugation means that any location of the pupil is one-to-one mapped to a location in the intermediate surface S. As a result, a laser beam sweeping across the intermediate surface S is also sweeping across the pupil of the projection lens.

On the other hand, key features of other aspects of embodiments of the present invention can be summarized as follows: For speckle reduction it is—in these cases essential—to have (a) a suitable large cone angle and (b) incoherence of the light forming and projecting the images to be displayed.

Property (a) can be achieved by appropriately choosing and setting the finite size of the aperture stop with respect and in relation to the finite distance between the aperture stop and the intermediate face.

Property (b) can be achieved by employing the sweeping process of the used light beam with respect to the intermediate face.

According to certain embodiments of the present invention one or a plurality of the following aspects may be essential for a projection type image generating apparatus s:

- Three image generating panels, each for displaying an image in the primary colors red, green and blue respectively.
- Three laser light sources, emitting light of primary colors red, green and blue respective.
- Laser beams of all three light sources converging—at common or different angles of incidence—to a common point or region at the sweep mirror and being reflected by the sweep mirror into common or different directions, dependent on the angle of incidence.
- By tilting the sweep mirror in one or two dimensions, the reflected laser beams are sweeping across common or different intermediate surfaces of illumination units.
- The illumination unit(s) being adapted in order to illuminate the red, green and blue image panels with red, green and blue laser light respectively.
- Means for combining the light from the red, green and blue image panel into a common light path.
- A projection lens for projecting the image of the image panels onto a screen.

According to FIGS. 4A to 4C, one or a plurality of the following aspects may be essential for an projection type image generating apparatus:

- Three image generating panels, each for displaying an image in the primary colors red, green and blue respectively.
- Three laser light sources, emitting light of primary colors red, green and blue respective. Two laser light sources (e.g. blue and green) combined into a common optical path.
- The common optical path of the two laser light sources (e.g. blue and green) and the single optical path of the remaining laser light source (e.g. red) converging under different angles of incidence at a common point of the sweep mirror and being reflected into two different directions, dependent on the angle of incidence.
- By tilting the sweep mirror in one or two dimensions, the reflected laser beams are sweeping across two different intermediate surfaces of illumination units, one common illumination unit for the common optical path (e.g. blue and green) and one illumination unit for the single optical path (e.g. red).
- The common illumination unit being adapted in order to illuminate both panels of the common path colors and a dichroic beam splitter in order to split the common light path after the common illumination unit into the single colors (e.g. blue and green).
- The single illumination being adapted in order to illuminate the panel of the single path color.
- X-Cube (also called cross-prism) for combining the light from the red, green and blue image panel into a common light path.
- A projection lens for projecting the image of the image panels onto a screen.

In the following, reference is taken in detail to the Figs.:

As already mentioned above, FIGS. 1 and 2 demonstrate the general principle of speckle reduction by using an intermediate face 21, 21-1, 21-2, 21-3; S, S1, S2, S3.

FIG. 1 is a schematical block diagram for elucidating basic aspects of an embodiment of an image generating apparatus 1 according to the present invention.

In FIG. 1 the embodiment of the image generating apparatus 1 according to the present invention comprises means 50 for generating primary illumination light L1. Said primary illumination light L1 is generated by one or a plurality of laser light sources 51 or other light sources which are capable of at least in part producing primary illumination light L1 which can have a coherence property. One or a plurality of light beams l are generated. Said primary illumination light L1 is generated, directed, and focused to a means 10 for deflecting said primary illumination light L1. Said means 10 for deflecting comprises at least one deflecting element 11. Said deflecting element 11 can be e.g. a mirror or any other deflecting entity, for instance a diffraction grating or the like. Said means 10 for deflecting and said deflecting element 11 are adapted in order to and comprise means for changing the orientational relationship of the reflection face, interface, surface, or plane of said reflecting element 11 when compared to the orientation and direction of the incident light beam l of the primary illumination light L1 in time. Consequently, said means 10 for deflecting is capable of having said incident light beam l of said primary illumination light L1 left said means 10 for deflecting after reflection under temporally changing angle or orientational relation or direction. Consequently, said means 10 for deflecting and said deflection element 11 are adapted to have the deflected light beam l of primary illumination light L1 move around either continuously or by jumping to and/or between a discrete set of angular positions or orientations.

The deflection of said means 10 for deflecting and of said deflecting element 11 are controlled and chosen in order to have said light beam l of primary illumination light L1 irradiate different positions and/or portions of an illumination unit 20 as means 20 for illuminating an image generation device 30 as in means 30 for generating an image and in particular an intermediate face, surface, interface, or plane 21, S comprised in said illumination unit 20 or means 20 for illuminating.

As in illumination unit 20 said means 20 for illuminating may comprise further optical elements such as collimation lenses 23-1, condenser lenses 23-2 and some light integration/integrator means 24-1, 24-2. The light beam l of incident primary illumination light L1 is therefore modified and temporally split up into a bundle of beamlets $B_j$ which for each instant of time generate an image, however, based on different irradiated portions of the intermediate face 21, S of said illumination unit 20.

The speckle pattern generated by the beamlets are uncorrelated to each other as long as the lateral distance between each beamlet is sufficiently large. Additionally, the light of the beamlets is incoherent to each other as it does not exist at the same point in time. Therefore, the individual speckle pattern generated by each beamlet superimpose on intensity basis, thereby reducing the speckle contrast of the superimposed image.

In FIG. 1 a diffusing screen or face 22, S' is also shown. Such a diffusing screen 22, S' may be used to further increase uniformity.

After interaction with the illumination unit the incident primary illumination light L1 leaves the illumination unit 20 as secondary illumination light L2 in order to be directed to means 30 for image generation which comprises an image modulator 31, e.g. an LCD element which can be operated in transmission or in reflection.

After interaction with said means 30 for image generation and in particular with said image modulator 31 said incident secondary illumination light L2 leaves said image generating means 30 as tertiary imaging light L3 in order to be directed to the following image projection means 40 or respective projection optics 40 which embodiment of FIG. 1 comprises a projection lens 42 with its aperture stop 41, AS in order to generate from said incident tertiary imaging light L3 projection light as L3' conveying the image I to be projected to a screen and/or to an observer's eye.

FIG. 2 is a schematical and perspective side view of another embodiment of an image generation apparatus 1 according to the present invention.

Again means 10 for deflecting a beam l of primary illumination light L1, an illumination unit 20 having an intermediate surface S, 21 and optional a diffuser screen 22, S', means 30 for generating an image I having an image modulator 31, and means 40 for projecting said image I as a projected image I' having an aperture stop AS, 41 and a projection lens 42 are provided which are positioned in a common optical path in this order in the direction of light propagation, i.e. from left to right in FIG. 2. In addition, FIG. 2 indicates that the intermediate face S, 21 and the face of the aperture stop AS, 41 are in optical conjugation with respect to each other, i.e. each portion irradiated on said intermediate face S, 21 is imaged on a respective portion of the face of the aperture stop AS, 41.

Figure 3:
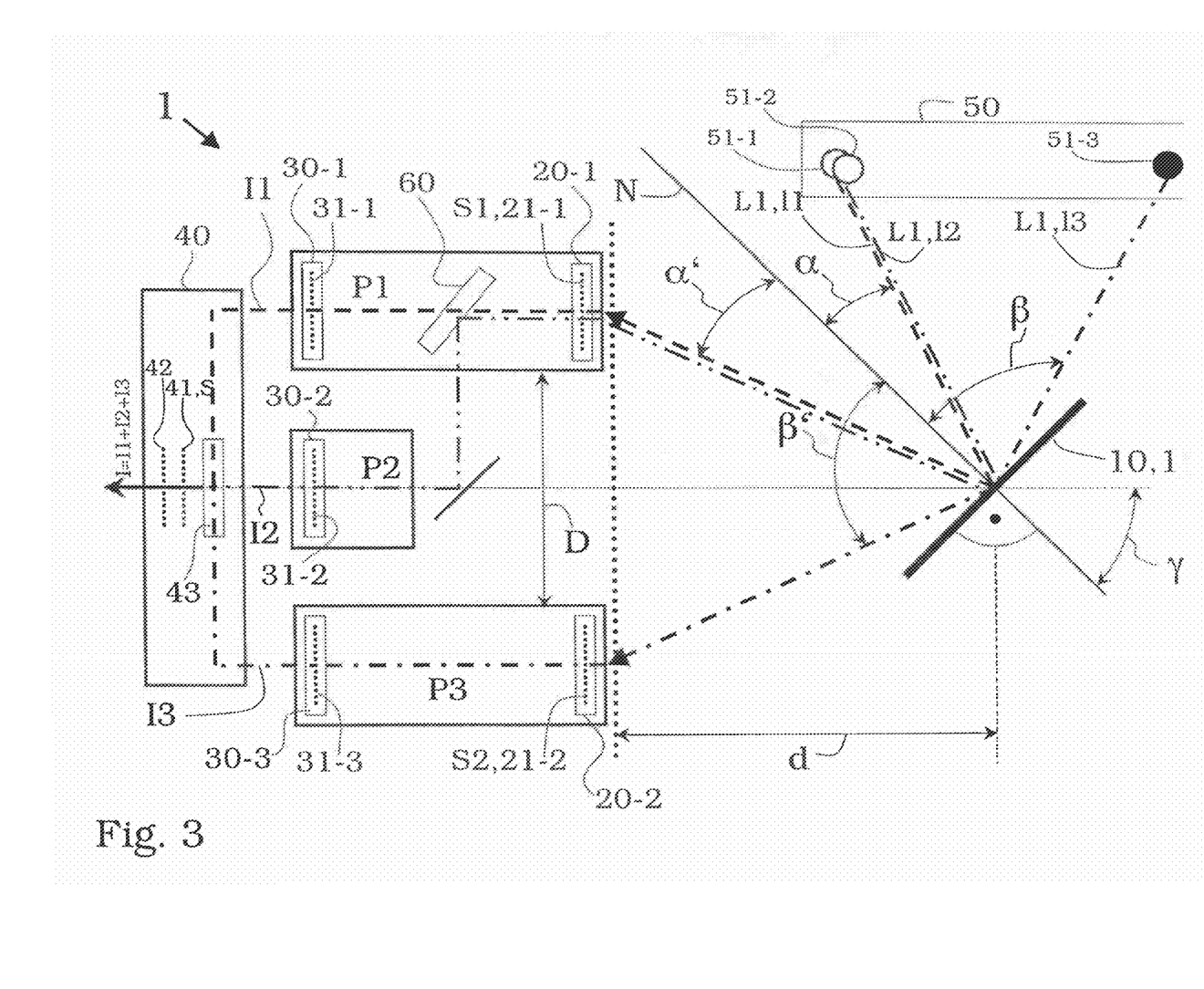
FIG. 3 is a schematic view demonstrating key ideas of an embodiment of an image generating apparatus according to the present invention.

FIG. 3 is a schematical top view for elucidating properties of an image generating apparatus 1 according to the present invention. Here the principles of FIGS. 1 and 2 are included, in particular with respect to a plurality of received light beams l1 and l2.

The embodiment shown in FIG. 3 comprises two image generating optical paths P1, P2 and P3 which are adapted to receive primary illumination light L1 and for generating respective partial images I1, I2 and I3 which may after their generation be combined to give an combined image I to be displayed or to be projected.

The light sources 51-1 and 51-2 are combined into one common path (P1+P2) before focused to mirror 11 and split after the illumination unit 20-1 by use of a dichroic mirror 60 into separate paths P1 and P2 in order to illuminate image panel 30-1 with light 11 and 30-2 with light 12.

For generating light beams l1, l2 and l3 of primary illumination light L1 and having distinct and different spectral properties light generating means 50 comprising a first light source 51-1, a second light source 51-2 and a third light source 51-3 is provided. The light sources 51-1, 51-2 and 51-3 are adapted and arranged in order to direct and focus respective light beams l1, l2 and l3 of primary illumination light L1 to a central portion of a mirror element 11 which is comprised in or which forms a single and common means 10 for simultaneously receiving and deflecting the plurality of light beams l1, l2 and l3 from said light sources 51-1, 51-2 and 51-3 to said image generating optical paths P1, P2 and P3 in order to irradiate the same or at least respective intermediate faces 21-1, S1; 21-2, S2 contained therein within respective means 20-1, 20-2 for illuminating which may also referred to as illumination units 20-1, 20-2.

It is an aspect of the embodiment shown in FIG. 3 that only one, i.e. a single deflecting means 10 is necessary in order to receive and deflect the plurality of light beams l1, l2 and l3 of primary illumination light to the respectively assigned optical paths P1. P2 and P3. Therefore, the assignment between the light sources 51-1, 51-2 and 51-3 the respective light beams l1, l2 and l3 and the optical paths P1 and P2 and its intermediate faces 21-1, S1; 21-2, S2 is realized by optical and geometrical means.

When using a reflecting element 11, for instance a mirror or the like as a part of said deflecting means 10, the distance D and the orientation between the image generating optical paths P1 and P2 as well as the position—e.g. the distance d and the orientation—of said single and common deflecting means 10 with respect to the image generating optical paths P1 and P2 are chosen such that by taking into account the fact that the law of reflection is fulfilled at the reflecting interface of the mirror 11 the first light beam l1 which is incident at an angle α is reflected at an identical reflection angle α' towards the assigned first image generating optical path P1, whereas the second light beam l2 which is incident at an angle β is reflected at an identical angle of reflection β' towards said assigned second image generating optical path P2.

Therefore, the crucial point is the arrangement of the image generating optical paths P1 and P2 with respect to the reflecting element 11 or the mirror 11 in connection with the position and orientation of the said first and second light source 51-1 and 51-2.

Of course, instead of a single light source 51-1 a combined light source might be used which irradiates as a first light beam l1 a plurality of spectral components at the same angle of incidence α.

This aspect is demonstrated in the embodiment as shown in FIG. 4A. Here, one light beam actually is a combined light beam comprising two colors, i.e. two different spectral components and therefore two light beams l1 and l2 in combination, whereas the other light beam l3 as a third light beam l3 conveys a single color only.

By using a common first collimation lens 23-1 said deflected first and second light beams l1 and l2 and said third light beam l3 are irradiated and collimated into the first and second optical paths P1 and P2, respectively. Therefore, said first and second light beams l1 and l2 use a common first illumination optical path P1. The third light beam l3 uses the other second illumination optical path P2.

A first component of each optical path P1 and P2 is inter alia formed by the mentioned means 20-1, 20-2 for illuminating which are also called illumination units 20-1 and 20-2, respectively. Each illumination unit 20-1, 20-2 may comprise first and second integrator plates 24-1 and 24-2 as well as a condenser lens 23-2.

After the condenser lens 23-2 said first and said second light beam l1 and l2 leave their common first illumination unit 20-1, said third light beam l3 leaves the respective second illumination unit 20-2.

Said first and second light beams l1, l2—as a combined beam l1+l2—are then subjected to color separation by interacting with a spectral selective mirror or dichroic mirror 60 spectrally subdividing or separating the combined first and second light beams or laser beams l1, l2 into a separate first colored light beam l1 and into a separate second colored light beam l2. The first colored light beam l1 conveying the first color transmits said dichroic mirror 60, is not deflected and enters a first polarization selective beam splitting cube PBS1. The second colored light beam l2 is deflected by 90° and enters a second provided polarization selective beam splitting cube PBS2.

Third light beam or laser beam l3 conveying said third color directly enters a provided third polarization selective beam splitting cube PBS3.

Each light beam is s-polarized when entering the PBS.

In each case after having entered the respective polarization selective beam splitting cube PBSj each light beam lj is deflected by 90° at the polarization selective interface of each polarization selective beam splitting cube PBSj in order to leave the respective polarization selective beam splitting cube PBSj and in order to enter a reflective image modulator 31-1, 31-2, 31-3 in the form of a respective reflective liquid crystal display LCD1, LCD2, LCD3 being comprised in respective first, second, and third means 30-1, 30-2, and 30-3, for image generation, respectively.

After being reflected at each of said liquid crystal displays LCDj, j=1, 2, 3 the polarization state of each reflected beam l1, l2, l3—now conveying a respect first, second and third colored partial image I1, I2, I3, respectively—has been partially changed, dependent on the image content on the reflective liquid display panels: Light from bright areas of each image have changed polarization state and travel through the polarization selective beam splitting cubes PBSj, whereas light from dark areas of each image—having not changed the polarization state—is being reflected at the polarization selective interface.

Each of the three beams l1, l2, l3 leaves the respective polarization selective beam splitting cube PBSj in order to enter a color recombination cube 43 according to the interaction of which the respective beams convey partial images I1, I2, and I3 each of which corresponding to the respective three colors are combined by entering into and interacting with a color recombination cube 43 into a single and combined image path which conveys a superposition I of said partial images I1, I2, and I3, which is projected on the screen.

FIG. 4B is a schematic side view of an embodiment of the image generating apparatus 1 according to the present invention, wherein a light pipe is used for illuminating the image modulator 31. Here the sweeping beam L enters a light input face of the provided light pipe. The light pipe redistributes and redirects the received light in order to make the light distribution more homogeneous.

Instead of using a light pipe, a rectangular beam shaper 22-1 may be involved as is shown in the embodiment according to FIG. 4C.

Figure 5:
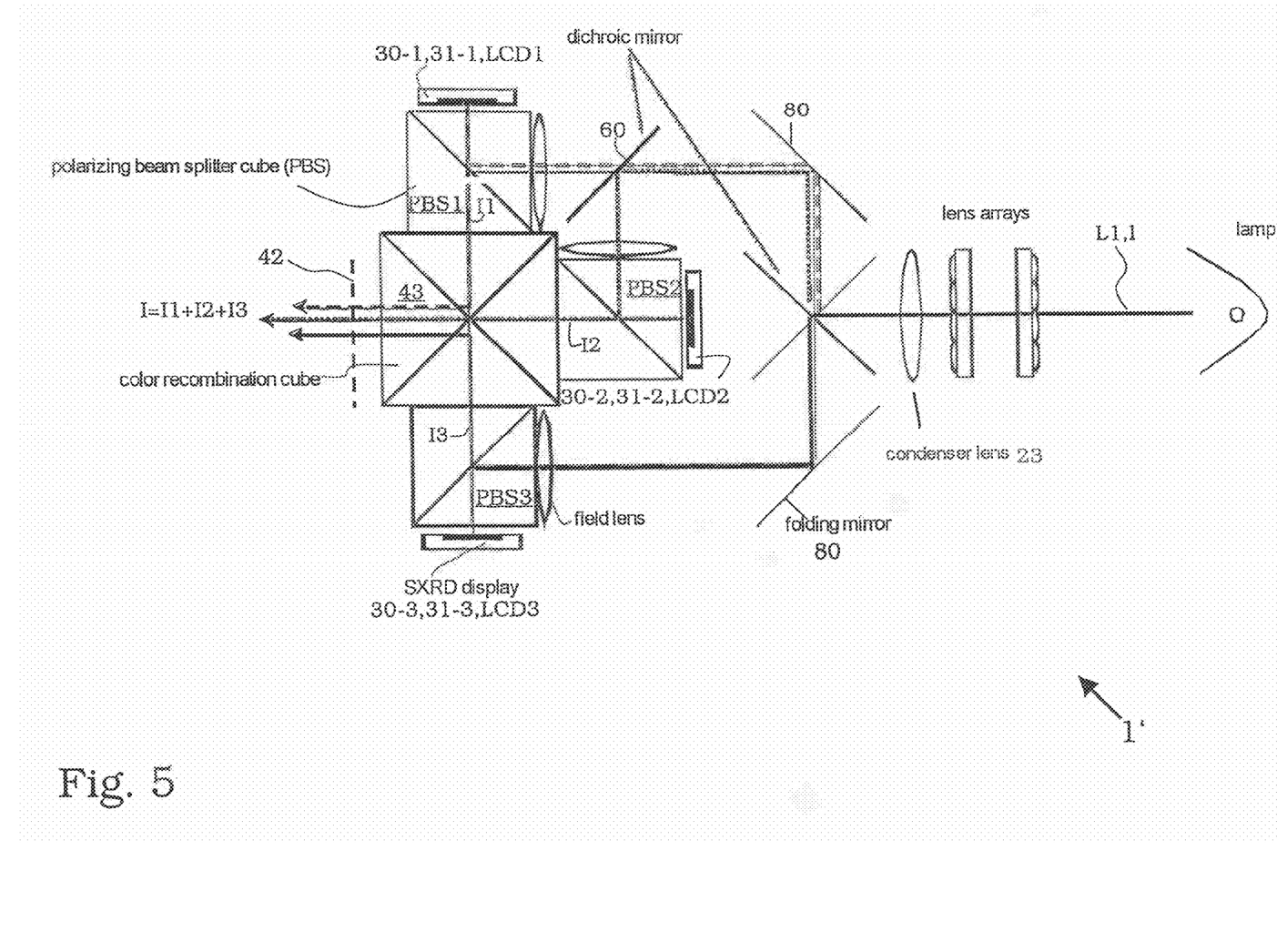
FIG. 5 is a schematic and cross-sectional side view of a common image generating apparatus.

FIG. 5 is a schematical and cross-sectional top view of a known image generating apparatus 1' again a combination of three polarization selective beam splitting cubes PBSj, j=1, 2, 3 in connection with three reflective liquid crystal display devices LCDj, j=1, 2, 3, and a common color recombination cube 43 are involved.

REFERENCE SYMBOLS 1 image generating apparatus according to the present Invention
1' known image generating apparatus according to the present invention
10 means for deflecting an incident light beam, beam deflection means
11 deflecting element, mirror
11' deflecting element at tilted position
20 means for illuminating, illumination unit
20-1 means for illuminating, illumination unit
20-2 means for illuminating, illumination unit
20-3 means for illuminating, illumination unit
21 intermediate face, intermediate surface, intermediate interface
21-1 intermediate face, intermediate surface, intermediate interface
21-2 intermediate face, intermediate surface, intermediate interface
21-3 intermediate face, intermediate surface, intermediate interface
22 diffuser, diffuser screen
22-1 rectangular beam diffuser
23-1 collimation lens
23-2 condenser lens
23-3 relay lens
23-4 lens
24 integrator plate
24-1 first integrator plate
24-2 second integrator plate
25 light pipe, light integration means
30 means for image generation
30-1 means for image generation
30-2 means for image generation
30-3 means for image generation
31 image modulator
31-1 image modulator
31-2 image modulator
31-3 image modulator
32 field lens
40 means for projecting, projection optics
41 aperture stop
42 projection lens
43 colour recombination unit/cube
50 means for generating primary illumination light, light source unit
51 light source, laser light source
51-1 light source, laser light source
51-2 light source, laser light source
51-3 light source, laser light source
52 cylindrical lens
60 dichroic mirror
80 folding mirror
AS aperture stop
B1, . . . , Bj, . . . beamlet
d distance
D distance
I image, combined image
I1 partial image
I2 partial image
I3 partial image
L light beam
LCD liquid crystal display element
LCD1 liquid crystal display element
LCD2 liquid crystal display element
LCD3 liquid crystal display element
L1 primary illumination light
L2 secondary illumination light
L3 tertiary illumination light
L3' projection light
l1 first light beam, first laser beam
l2 second light beam, second laser beam
l3 third light beam, third laser beam
P1 optical path
P2 optical path
P3 optical path
PBS1 polarization selective beam splitting means/cube
PBS2 polarization selective beam splitting means/cube
PBS3 polarization selective beam splitting means/cube
S intermediate face, intermediate surface, intermediate interface
S1 intermediate face, intermediate surface, intermediate interface
S2 intermediate face, intermediate surface, intermediate interface
S3 intermediate face, intermediate surface, intermediate interface
S' face/interface of image modulator
$\alpha$ angle of incidence
$\alpha'$ angle of reflection
$\beta$ angle of incidence
$\beta'$ angle of reflection
$\gamma$ tilting angle

The invention claimed is:

1. An image generating apparatus, comprising:
a plurality of image generating optical paths, each of said image generating optical paths having a respective intermediate face;
a sweep mirror, common for said plurality of optical paths, that simultaneously deflects a received plurality of light beams of primary illumination light having coherence properties, each of said light beams being assigned to a respective one of said image generating optical paths,
wherein each of said image generating optical paths includes, respectively,
one of a plurality of image generating panels that generate respective partial images and display said respective partial images in one of the primary colors red, green, and blue, respectively, and
means for illuminating said respective image generating panels, each of said means for illuminating having said respective intermediate face and modifying a respective beam of light to illuminate a respective image generating panel uniformly and with a beam shape being congruent to a shape of the respective image generating panel,
wherein said sweep mirror is configured to simultaneously optically couple each of said received light beams into a respective assigned optical path to simultaneously irradiate each of said intermediate faces with a respective one assigned light beam,
wherein said sweep mirror is configured to have, during said irradiating and by being tilted, each of said light beams, by reflecting said light beams into common or different directions, dependent on an angle of incidence of each of said light beams, subsequently in time irradiate different portions of said respective assigned intermediate face by sweeping each of said respective light beams across said respective intermediate face;
a projection lens that projects said partial images received from said respective image generating panels and displayed on the respective image generating panels,
wherein said projection lens has an aperture stop, and
wherein each one of said intermediate faces of said respective means for illuminating is positioned in optical conjugation with respect to said aperture stop;
three laser light sources that emit light of said respective primary colors and include optical means for converging respective light beams at common or different angles of incidence to a common point or region at said sweep mirror; and
means combining said light beams of said primary colors emitted from said respective image generating panels into a common optical path.

2. The image generating apparatus according to claim 1,
wherein two laser light sources are combined into a common optical path,
wherein said common optical path for said two laser light sources and the single optical path for the remaining laser light source are converged under different angles of incidence at a common point or region of said sweep mirror and reflected into different directions, dependent on the angle of incidence,
wherein one common illumination unit is provided for the common optical path and one illumination unit is provided for the single optical path, and
wherein an X-cube or cross-prism is provided for combining the red, green, and blue light of the partial images into said common optical path.

3. The image generating apparatus according to claim 1,
wherein said intermediate face is a surface of said respective means for illuminating.

4. The image generating apparatus according to claim 1,
wherein said intermediate face is an interface of said means for illuminating.

5. The image generating apparatus according to claim 1,
wherein said intermediate face is a virtual plane of said means for illuminating.

6. The image generating apparatus according to claim 1,
wherein said intermediate face is a face of a diffuser of said means for illuminating.

7. The image generating apparatus according to claim 1,
wherein said means for projecting comprises means for receiving and combining said partial images into a combined image.

8. The image generating apparatus according to claim 1,
wherein each of said means for illuminating comprises an illumination unit.

9. The image generating apparatus according to claim 1, further comprising,
single first collimation optics common for said plurality of image generating optical paths.

10. The image generating apparatus according to claim 1, further comprising,
a rectangular beam diffuser disposed in at least one of said plurality of image generating optical paths to illuminate said respective means for generating a partial image.

11. An image generating apparatus, comprising:
a plurality of image generating optical paths, each of said image generating optical paths having a respective intermediate face; and
means for deflecting a received plurality of light beams of primary illumination light having coherence properties simultaneously, said means for deflecting being common for said plurality of image generating optical paths and each of said light beams being assigned to a respective one of said image generating optical paths,
wherein each image generating optical path includes
means for generating a partial image, and
means for illuminating said means for generating said partial image, each means for illuminating having said respective intermediate face,
wherein said means for deflecting is configured to simultaneously optically couple each of said received light beams into a respective assigned optical path to simultaneously irradiate each of said intermediate faces with a respective one assigned light beam,
wherein said means for deflecting is configured to have, during said process of irradiating, each of said light beams subsequently in time irradiate different portions of said respective assigned intermediate face; and
means for projecting said partial images received from said respective means for generating said partial images,
wherein said means for projecting said partial images has an aperture stop, and
wherein each of said intermediate faces of said respective means for illuminating is positioned in optical conjugation with respect to said aperture stop.

12. The image generating apparatus according to claim 11,
wherein said means for deflecting is adapted to have, during said process of irradiating said intermediate faces, each of said light beams take consecutively in time different positions on said respective assigned intermediate face.

13. The image generating apparatus according to claim 11, wherein said means for deflecting is adapted to have, during said process of irradiating said intermediate faces, each of said light beams sweep across said respective assigned intermediate face.

14. The image generating apparatus according to claim 11, wherein said means for deflecting is adapted to have, during said process of irradiating said intermediate face, each of said light beams continuously move across said respective intermediate face.

15. The image generating apparatus according to claim 11, further comprising means for generating primary illumination light which is focused to a focal plane, wherein said means for deflecting is positioned in said focal plane.

16. The image generating apparatus according to claim 11, wherein said means for deflecting includes a mirror.

17. The image generating apparatus according to claim 16, wherein said mirror is adapted for being mechanically tilted to deflect each of said received light beams across said respective assigned intermediate face.

18. The image generating apparatus according to claim 16, wherein said mirror is adapted to have each of said deflected light beams move across said respective assigned intermediate face in one of a circular manner, a linear manner, a cyclical manner and a chaotic manner.

19. The image generating apparatus according to claim 11, further comprising means for generating primary illumination light which is adapted to direct said primary illumination light to said means for deflecting said received plurality of light beams of primary illumination light.

20. The image generating apparatus according to claim 19, wherein said means for generating primary illumination light has a plurality of laser light sources.

21. The image generating apparatus according to claim 19, wherein said means for generating primary illumination light has a plurality of arrays of laser light sources which are adapted to generate and direct respective arrays of laser light beams to said means for deflecting said received plurality of light beams of primary illumination light.

22. The image generating apparatus according to claim 11, wherein each of said means for generating a partial image comprises a respective image modulator.

23. The image generating apparatus according to claim 11, wherein each of said means for generating a partial image comprises at least one respective liquid crystal display element.

24. The image generating apparatus according to claim 11, further comprising,
a light pipe configured to illuminate the respective means for generating a partial image.

* * * * *